(12) United States Patent
Stubbs et al.

(10) Patent No.: US 6,801,688 B1
(45) Date of Patent: Oct. 5, 2004

(54) FIBER OPTIC COLLIMATOR APPARATUS AND METHOD

(75) Inventors: David M. Stubbs, Mountain View, CA (US); Raymond M. Bell, Jr., Redwood City, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 10/330,783

(22) Filed: Dec. 26, 2002

(51) Int. Cl.[7] .................................................. G02B 6/32
(52) U.S. Cl. ........................ 385/33; 359/362; 359/462; 359/619; 359/642
(58) Field of Search ............................. 385/15, 24, 27, 385/33

(56) References Cited

U.S. PATENT DOCUMENTS 6,088,085 A * 7/2000 Wetteborn ................. 356/5.01
6,438,288 B1 * 8/2002 Tehrani ....................... 385/27

* cited by examiner

Primary Examiner—Phan T. H. Palmer
Assistant Examiner—Jennifer Doan
(74) Attorney, Agent, or Firm—McDermott Will & Emery LLP

(57) ABSTRACT

Embodiments of the present invention are directed to a compact and stable fiber optic collimator that takes light from one or more optical fibers and generates one or more beams of collimated light at an increased specified diameter. The collimator is configured for easy assembly and for simple and precise adjustment. In one embodiment, a fiber optic collimator comprises a shuttle plug including a cavity for receiving an optical fiber having an optical fiber tip to emit a light through the shuttle plug. A collimator body has a collimator bore to receive the shuttle plug and constrain the shuttle plug in the collimator bore to be movable in an axial direction along an axis of the collimator bore. A collimating lens is mounted to the collimator body and disposed generally opposite from the optical fiber tip to receive a light beam from the optical fiber tip expanding in size toward the collimating lens.

24 Claims, 7 Drawing Sheets

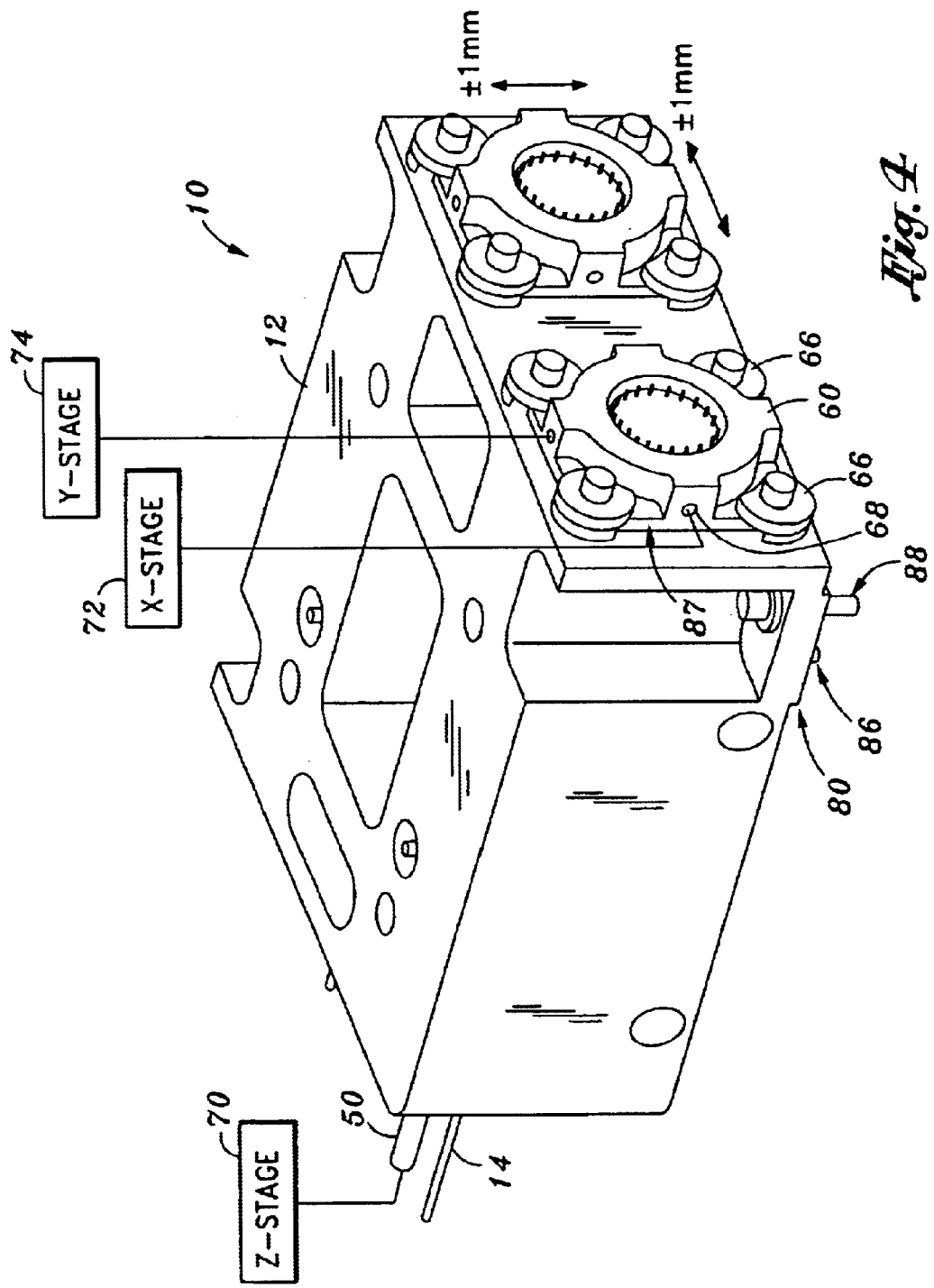

FIBER OPTIC COLLIMATOR APPARATUS AND METHOD

STATEMENT AS TO RIGHTS TO INVENTIONS MADE UNDER FEDERALLY SPONSORED RESEARCH OR DEVELOPMENT

The invention described herein was made in the performance of work under Contract No. F33657-01-C-4165.

BACKGROUND OF THE INVENTION

The present invention relates generally to transmission of fiber-optic signals and, more particularly, to a collimator for transforming the output from one or more optical fibers into one or more parallel optical beams.

Many fiber-optic devices r that the output from one or more optical fibers be converted into collimated beams. A fiber optic collimator takes light from a optical fiber and generates a beam of collimated light at an increased specified diameter. The collimator desirably maintains alignment between the fiber and the collimating lens When two or more optical fibers are coupled to the same collimator (referred to as expanded beam coupling), high precision alignment of the respective fibers is necessary. Previous fiber optic collimators tend to be clumsy, employ complex mechanisms, and are difficult to assemble and adjust for focus and alignment.

BRIEF SUMMARY OF THE INVENTION

Embodiments of the present invention are directed to a compact and stable fiber optic collimator that takes light from one or more optical fibers and generates one or more beams of collimated light at an increased specified diameter. The optical fibers are connected to a single collimator body having precise collimator bores for receiving and aligning the optical fibers relative to the respective collimating lenses. Each lens is configured to be adjustable along its plane for aliment with respect to the tip of the corresponding optical fiber. The optical fiber is configured to be adjustable along an axis of the collimator bore to focus the light beam to obtain the desired wavefront quality. After a first set of optical fiber and collimating lens are aligned, the other sets of optical fiber and collimating lens may be aligned with respect to the first set The collimator is designed to achieve a substantially athermal configuration. The collimator is stable over a specific soak temperature range and maintains alignment through adverse vibration. The collimator is configured for easy assembly and for simple and precise adjustment.

In accordance with an aspect of the present invention, a fiber optic collimator comprises a shuttle plug including a cavity for receiving an optical fiber having an optical fiber tip to emit a light through the shuttle plug. A collimator body has a collimator bore to receive the shuttle plug and constrain the shuttle plug in the collimator bore to be movable in an axial direction along an axis of the collimator bore. A collimating lens is mounted to the collimator body and disposed generally opposite from the optical fiber tip to receive a light beam from the optical fiber tip expanding in size toward the collimating lens. The collimating lens is constrained to be movable in a transverse plane normal to the axial direction. The shuttle plug is configured to be movable in the axial direction to adjust a position of the optical fiber tip with respect to the collimating lens and the collimating lens is configured to be movable in the transverse plane to align the collimating lens with respect to the optical fiber tip.

In some embodiments, the shuttle plug includes a fiber optic ferrule to attach the optical fiber and position the optical fiber tip within the shuttle plug. The shuttle plug includes a pin keyway and the collimator body includes a rotation alignment pin configured to engage the pin keyway to prevent rotation of the shuttle plug with respect to the collimator body. The fiber optic ferrule is rotationally aligned with respect to the pin keyway for desired polarization of the light beam from the optical fiber. The fiber optic ferrule is connected to the shuttle plug by an adhesive introduced into adhesive tack bond holes in the shuttle plug at two axial locations along the fiber optic ferrule (e.g., six adhesive tack bond holes at two axial locations, 120 degrees apart). The shuttle plug includes an undercut diameter intermediate region between two end regions, and wherein the two end regions each include machined flats to reduce surface contact with the bore of the collimator body (e.g., three 120 degrees opposed machined flats). The shuttle plug is connected to the collimator body by an adhesive introduced into adhesive tack bond holes in the collimator body at two axial locations along the shuttle plug (e.g., six adhesive tack bond holes at two axial locations, 120 degrees apart).

In specific embodiments, a lens cell has a seat to receive the collimating lens. The lens cell is configured to mount the collimating lens to the collimator body to permit adjustment in the transverse plane normal to the axial direction to align the collimating lens with respect to the optical fiber tip. The lens cell is connected to the collimator body by an adhesive introduced into adhesive tack bond holes in the collimator body distributed around the lens cell. The lens cell is attached to the collimator body by a plurality of cell clamps (which is desirable in severe environments). The collimator body includes a plurality of raised pads (e.g., three pads) which are coplanar and parallel to the axis of the collimator bore. The raised pads are configured to interface with a mating piece to which the collimator body is to be connected. The collimator body may include a plurality of collimator bores to receive a plurality of shuttle plugs, and the collimator body is configured to mount a plurality of collimating lenses each for alignment and focus with respect to a corresponding one of the plurality of shuttle plugs.

In accordance with another aspect of the invention, a fiber optic collimator comprises a shuttle plug including a cavity for receiving an optical fiber having an optical fiber tip to emit a light through the shuttle plug. A collimator body has a collimator bore to receive the shuttle plug and constrain the shuttle plug in the collimator bore to be movable in an axial direction along an axis of the collimator bore. A lens cell has a seat to receive a collimating lens, and is configured to mount the collimating lens to the collimator body generally opposite from the optical fiber tip to receive a light beam from the optical fiber tip expanding in size toward the collimating lens and to permit adjustment of the collimating lens in a transverse plane normal to the axial direction to align the collimating lens with respect to the optical fiber tip.

In some embodiments, the lens cell is connected to the collimator body by an adhesive introduced into adhesive tack bond holes in the collimator body distributed around the lens cell. The lens cell is attached to the collimator body by a plurality of cell clamps.

In accordance with another aspect of the invention, a method of mounting an optical fiber and a collimating lens to a collimator body comprises mounting an optical fiber to a shuttle plug, the optical fiber having an optical fiber tip to emit a light through the shuttle plug; and sliding the shuttle plug into a collimator bore of the collimator body configured to receive the shuttle plug and constrain the shuttle plug in the collimator bore to be movable in an axial direction along an axis of the collimator bore. A collimating lens is mounted to the collimator body to be disposed generally opposite from the optical fiber tip to receive a light beam from the optical fiber tip expanding in size toward the collimating lens. The shuttle plug is moved in the axial direction to adjust a position of the optical fiber tip with respect to the collimating lens.

In some embodiments, mounting the collimating lens comprises placing the collimating lens in a seat of a lens cell; coupling the lens cell to the collimator body to permit adjustment in a transverse plane normal to the axial direction; moving the lens cell with respect to the collimator body in the transverse plane to align the collimating lens with respect to the optical fiber tip; and attaching the lens cell to the collimator body after the collimating lens is aligned with respect to the optical fiber tip. Moving the lens cell comprises connecting the lens cell to two linear stages configured to move the lens cell in two orthogonal directions along the transverse plane. Moving the shuttle plug comprises coupling a focus tooling member with the shuttle plug by supporting a focus tooling rod using a focus tooling clamp temporarily coupled to the collimator body. The focus tooling member is connected to a linear stage configured to move the shuttle plug in the axial direction to focus the optical fiber tip with respect to the collimating lens. The method further comprises attaching the shuttle plug to the collimator body and removing the focus tooling rod and the focus tooling clamp after focusing the optical fiber tip with respect to the collimating lens.

In specific embodiments, mounting the optical fiber comprises coupling the optical fiber to a fiber optic ferrule and attaching the fiber optic ferrule to the shuttle plug to position the optical fiber tip within the shuttle plug. The shuttle plug includes a pin keyway, and the fiber optic ferrule is rotationally aligned with respect to the pin keyway for desired polarization of the light beam from the optical fiber. A rotation alignment pin is inserted through a portion of the collimator body to engage the pin keyway to prevent rotation of the shuttle plug with respect to the collimator body. The collimator body includes a plurality of raised pads (e.g., three raised pads) which are coplanar and parallel to the axis of the collimator bore. The method further comprises interfacing the raised pads with a mating piece to which the collimator body is to be connected. The method further comprises providing a pin extending from two raised pads of the collimator body to two oversized pin holes in the mating piece; wet-pinning the pin to the mating piece by introducing an adhesive into the oversized pin holes; and attaching the collimator body to the mating piece by a plurality of screws. This process mitigates against drilling.

BRIEF DESCRIPTION OF THE DRAWINGS

FIG. 4 is another perspective view of the fiber optic collimator of FIG. 1 illustrating the lens cells and clamps;

DETAILED DESCRIPTION OF THE INVENTION

Figure 1:
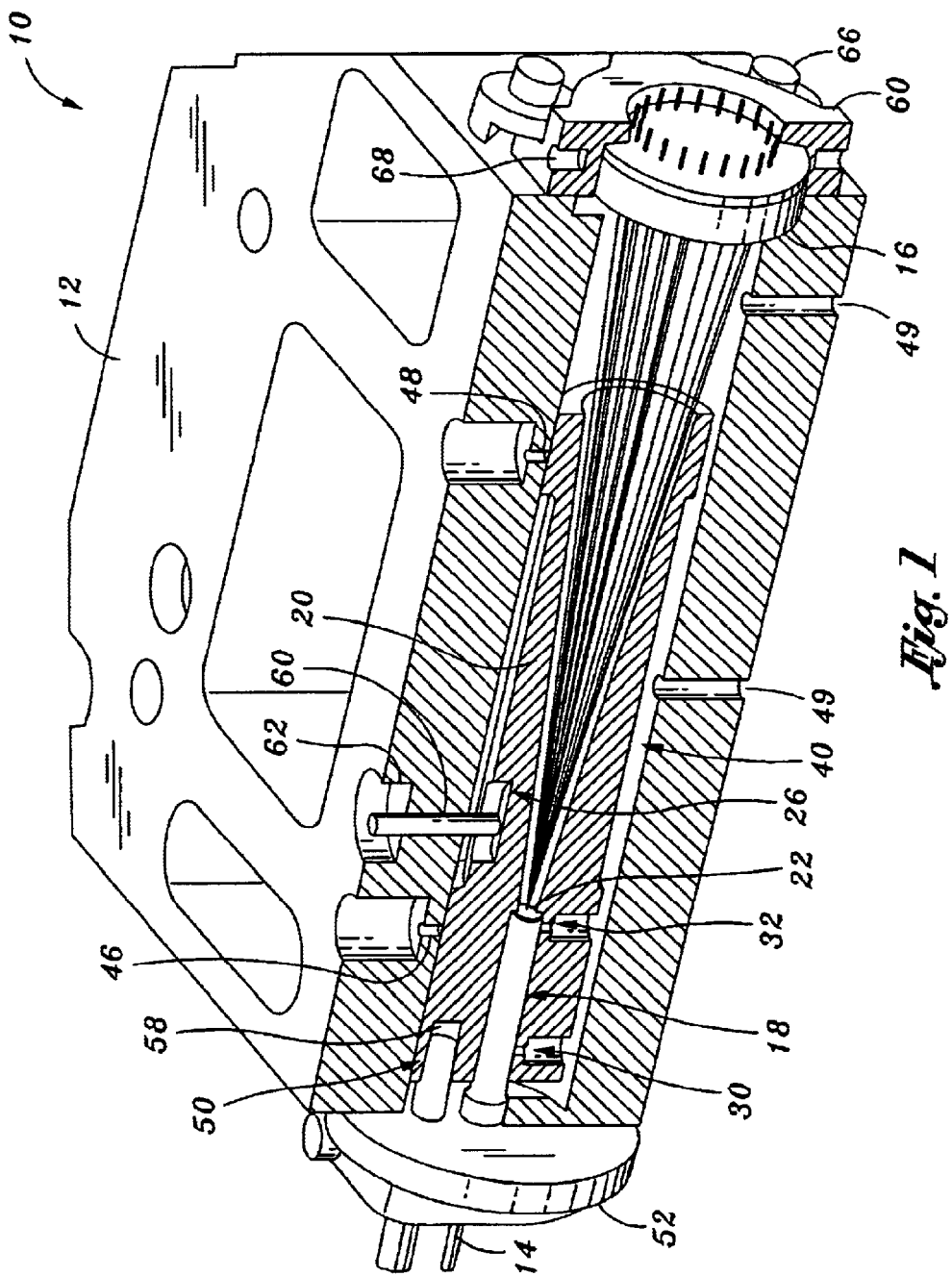
FIG. 1 is a partially cut-away perspective view of a fiber optic collimator according to an embodiment of the present invention.

FIG. 1 shows a fiber optic collimator 10 having a collimator body 12. An optical fiber 14 is coupled to one side of the collimator body 12, while a collimating lens 16 is coupled to another side of the body 12 to generate a beam of collimated light from the light of the optical fiber 14 at an increased specified diameter.

The polished end of the optical fiber 14 is connected to a fiber optic ferrule 18 which is disposed in a cavity of a shuttle plug 20 that is inserted into the collimator body 12. The tip 22 of the optical fiber 14 emits a light beam that expands to the desired diameter as it reaches the collimating lens 16. The fiber optic ferrule 18 is typically made of a glass or ceramic. Prior to inserting the shuttle plug 20 into the collimator body 12, the ferrule 18 is inserted into the shuttle plug 20 and rotationally aligned with respect to a pin keyway 26 for optimum polarization of the light beam. The alignment with respect to the pin keyway 26 ensures that the optical fiber 14 is oriented properly during assembly of the shuttle plug 20 with the collimator body 12. To secure the ferrule 18 to the shuttle plug 20, two sets of adhesive tack bond holes 30, 32 are disposed near the two ends of the ferrule 18. In the specific embodiment, three bond holes 30 are angularly spaced by about 120 degrees and three bond holes 32 are angularly spaced by about 120 degrees, and each bond hole is about 0.040 inch in diameter for adequate bonding under most circumstances. A suitable adhesive, such as 3M 2216, is introduced into the bond holes 30, 32 to secure the ferrule 18. Of course, other suitable ways of securing the ferrule 18 may be used in different embodiments.

Figure 2:
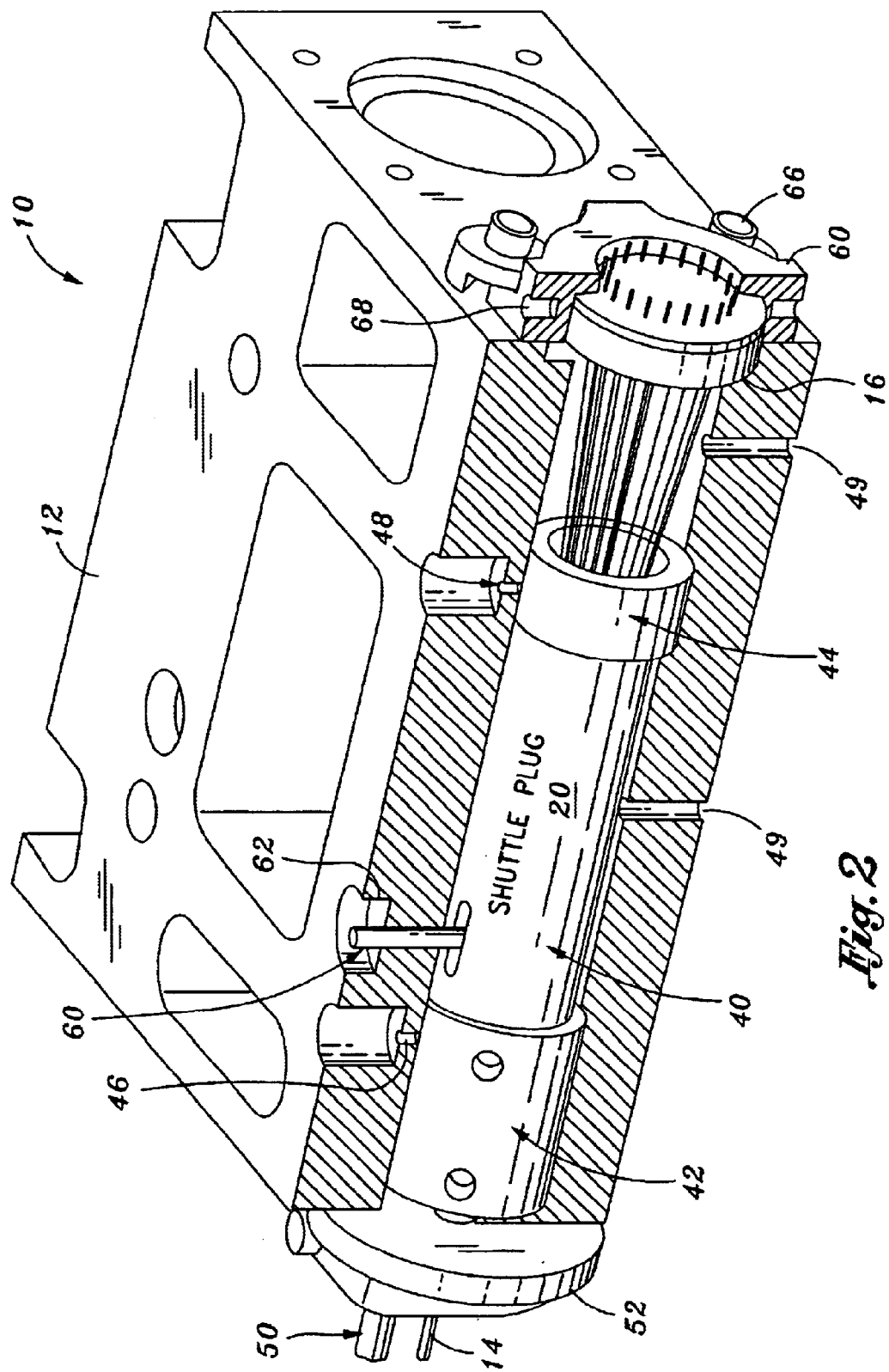
FIG. 2 is another partially cut-away perspective view of the fiber optic collimator of FIG. 1 illustrating the shuttle plug.

As seen in FIGS. 1 and 2, the shuttle plug 20 has an outer diameter that is sized to slide within a precision bore in the collimator body 12. The shuttle plug 20 serves to provide easy assembly and precise alignment and stability of the optical fiber 14 with respect to the collimating lens 16. The shuttle plug 20 is made as long as possible (or necessary) given the constraints of the collimator body 12 to minimize the pointing error of the plug 20 (and optical fiber 14) with respect to the collimator body 12. To ensure high precision of the interface between the shuttle plug 20 and the core of the body 12, the shuttle plug 20 desirably includes an undercut diameter intermediate region 40 between the two end regions. The two end regions each include machined flats 42, 44, respectively, to limit the surface contact with the precision bore of the body 12. In the specific embodiment shown, the end regions each have three machined flats 42, 44, evenly distributed angularly so as to allow three surfaces, spaced by about 120 degrees, to come in contact with the precision bore. Of course, other ways of limiting surface contact between the shuttle plug 20 and the bore of the collimator body 12 may be used in alternate embodiments.

The collimator body 12 includes two sets of adhesive tack bond holes 46, 48 that are disposed near the two ends of the shuttle plug 20 for securing the plug 20. In the specific embodiment shown, three bond holes 46 are angularly spaced by about 120 degrees and three bond holes 48 are angularly spaced by about 120 degrees (aligned to the three lobed, raised diameters at both ends), and each bond hole is about 0.050 inch in diameter for adequate bonding under most circumstances. When the shuttle plug 20 is ready to be secured to the collimator body 12 after alignment with respect to the lens 16, a suitable adhesive, such as 3M 2216, is introduced into the bond holes 46, 48. Of course, other suitable ways of securing the shuttle plug 20 may be used in alternate embodiments. The collimator body 12 desirably includes bleed holes 49 for bleeding air.

Figure 3:
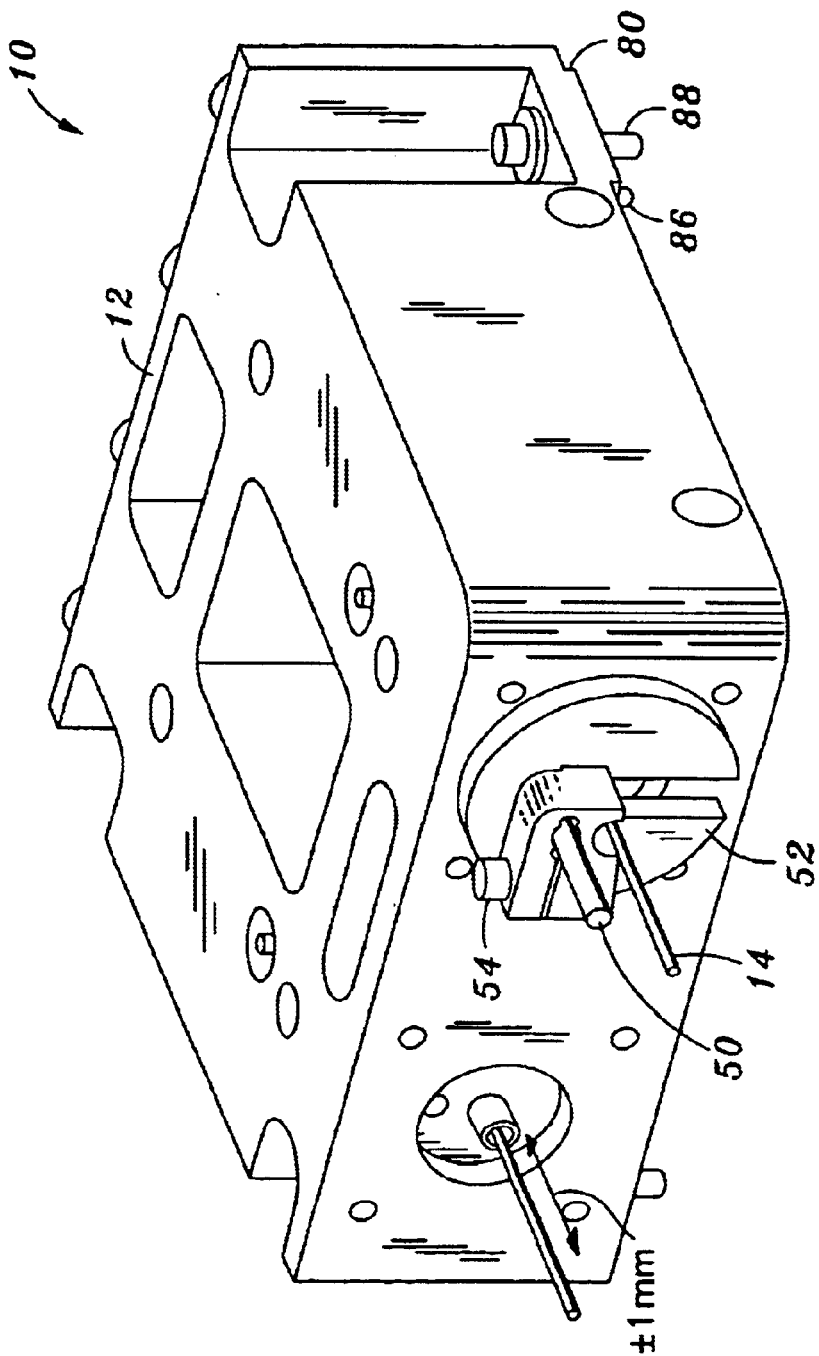
FIG. 3 is another perspective view of the fiber optic collimator of FIG. 1 illustrating the focus tooling clamp.

Coupled to the shuttle plug 20 is a focus tooling rod 50 which is used to focus the optical fiber 14 in the axial direction along the axis of the collimator bore which coincides with the axis of the shuttle plug 20, as illustrated in FIGS. 1–3. A focus tooling clamp 52 is connected to both the focus tooling rod 50 and the collimator body 12, and can be tightened against the rod 50 using a clamp screw 54. The focus tooling rod 50 extends into a threaded cavity 58 inside the shuttle plug 20.

After sliding the assembly of the shuttle plug 20 and the focus tooling rod 50 into the precision bore of the collimator body 12 and before aligning and securing the plug 20 to the body 12, a rotation alignment pin 60 is pressed into the body 12 to engage the pin keyway 26 of the shuttle plug 20 with the plug 20 roughly in place. The length of the rotation alignment pin 60 is such that it will be set to the correct depth when the outer end is flush with the body 12. A counter bore 62 around the outer end of the alignment pin 60 allows for disassembly. The rotation alignment pin 60 prevents rotation of the shuttle plug 20 with respect to the collimator body 12. After the shuttle plug 20 is secured to the body 12, the focus tooling clamp 52 is tack bonded to the collimator body 12 with the optical fiber 14 and focus tooling rod 50 protruding therethrough, as best seen in FIG. 3. The attachment of the focus tooling clamp 52 to the body 12 desirably is temporary, so that it may be detached from the body 12 subsequently. It is understood that other ways of attaching the focus tooling clamp 52 to the body 12 may be used.

Figure 4A:
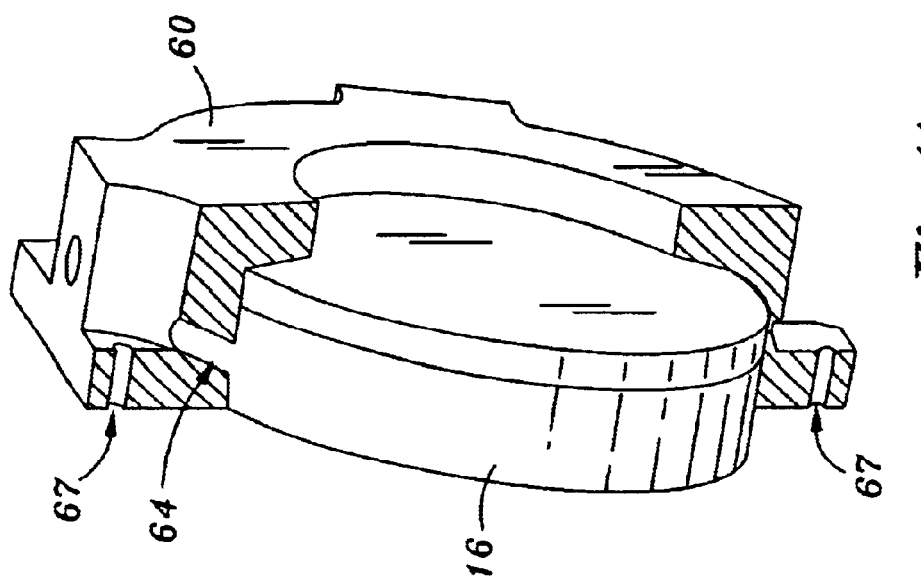
FIG. 4A is a partially cut-away perspective view of a lens cell of the fiber optic collimator FIG. 1.

The collimating lens 16 is mounted to the collimator body 12 using a lens cell 60, as shown in FIGS. 1, 2, 4A, and 4. The lens 16 (which may be a doublet) is tack bonded into a precision bore of the lens cell 60 via a plurality of glue holes 64 (see FIG. 4A). In a specific embodiment, there are eight equally spaced glue holes 64 extending into the lens bore. It is understood there are other ways to attach the lens. In some embodiments, the glue holes 64 are angled less than 90 degrees from the cell registration seat in which the lens 16 is positioned, thereby causing the adhesive to pull the lens 16 onto the seat as it cures, depending on the adhesive shrinkage during cure. A plurality of adhesive tack bond holes 67 and (if desired) an additional plurality of cell clamps 66 are used to attach the lens cell 60 to the collimator body 12. FIG. 4 shows either tack bond holes 67 and four cell clamps 66 for each cell 60.

One way to align the lens 16 (and the lens cell 60) and the optical fiber 14 (and the shuttle plug 20) with respect to the collimator body 12 is by using three single axis, micron resolution stages. With the collimator body 12 held in place by an alignment fixture, one stage (z-stage 70) holds the focus tooling rod 50 (in the z or axial direction of the bore) while the other two stages (x-stage 72 and y-stage 74) orthogonally locate the lens cell 60 on the precision machined body surface or transverse plane normal to the shuttle plug bore (in the x and y directions). This adjustment aligns the optical center of the collimating lens 16 with respect to the optical fiber tip 22. The lens cell 60 conveniently has four threaded holes 68 (two in the x-direction and two in the y-direction) for ease of attachment to the linear stages. By iteratively moving the lens cell 60 in the x and y directions using the x and y stages 72, 74 and moving the focus tooling rod 50 in the z direction using the z stage 70, the positions of the optical fiber 14 and the lens 16 can be obtained with proper focus and alignment to achieve the desired optical pointing and wavefront. The adjustments typically fall within about ±1.0 mm. During the alignment process, the lens cell 60 can be held against the collimator body 12 using a compression spring mechanism or other suitable temporary attachment mechanisms. After alignment, the lens cell 60 is tack bonded to the collimator body 12 via a plurality of bond holes 67. Once the adhesive is cured, the four clamps 66 can be used to further secure the lens cell 60 in place, if desired. Of course, other ways of securing the lens cell 60 may be used in alternate embodiments.

After alignment of the lens cell 60, the x-stage 72 and y-stage 74 and temporary attachment mechanism are removed and the wavefront is confirmed and adjusted if necessary via the focus stage 70 prior to bonding the shuttle plug 20 in place. As seen in FIG. 3, the focus tooling clamp 52 contains a simple wrap-around flexure provided by a necked down section that grabs the focus tooling rod 50, preventing movement of the shuttle plug 20 during cure. Because the collimator body 12 is held in place by the alignment fixture, the entire assembly can be tested both in air and in vacuum prior to bonding the shuttle plug 20 to the body 12. The focus tool clamp 52 also allows the collimator 10 to be removed from the test setup for tack bonding elsewhere, if desired. Once the collimator 10 is optically verified for quality and alignment of the wavefront beam after the bonding process, it is removed from the alignment fixture and the focus tooling rod 50 and clamp 52 are removed from the collimator body 12.

Figure 5:
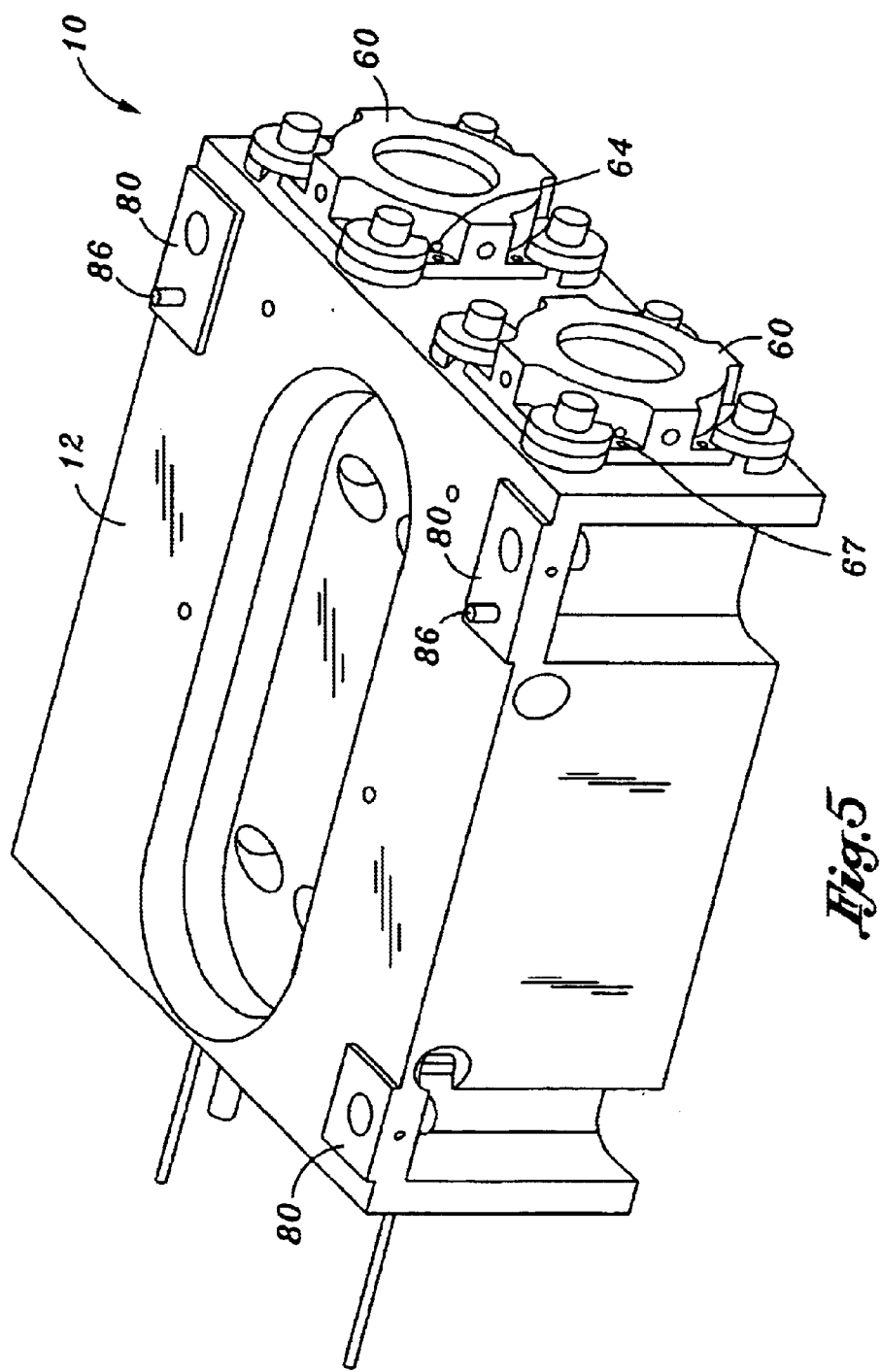
FIG. 5 is another perspective view of the fiber optic collimator of FIG. 1 illustrating the raised pads.

FIG. 5 shows that the collimator body 12 includes three raised pads 80 which are precision machined to be coplanar and parallel to the center line of the shuttle plug 20. The three raised pads 80 provide mating surfaces for coupling the collimator 10 to a mating piece, which may be an interferometry apparatus, lithography apparatus, or the like.

Figure 6:
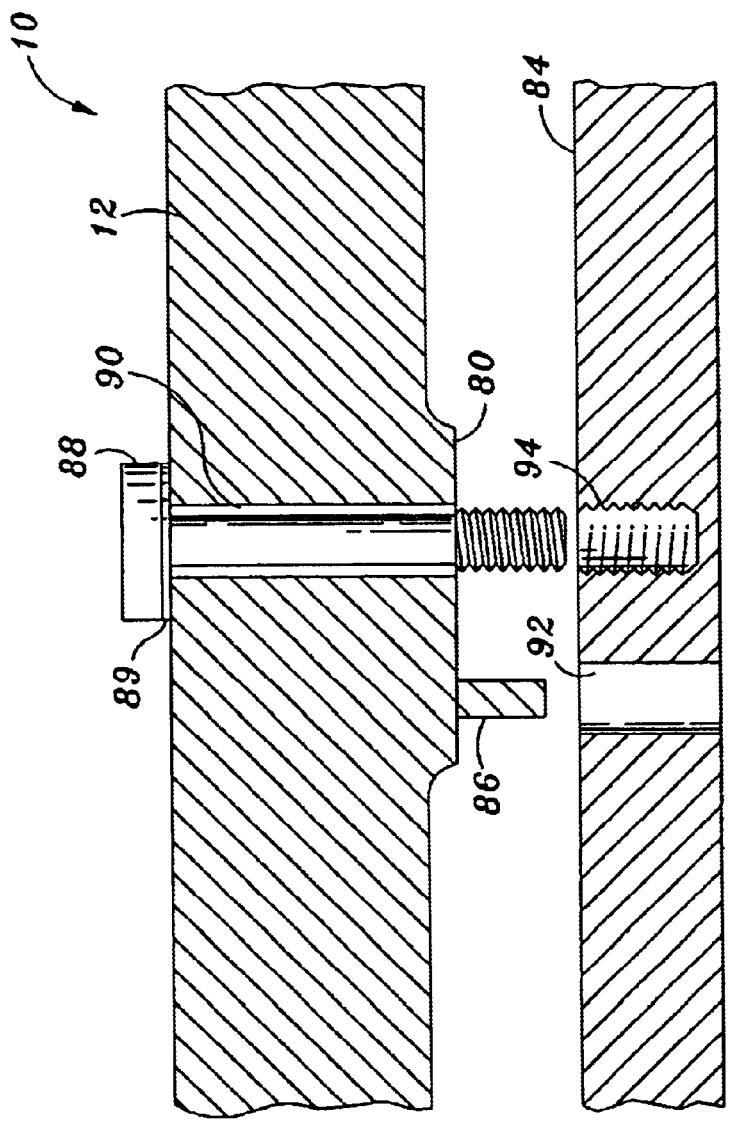
FIG. 6 is a cross-sectional view illustrating attachment of the fiber optic collimator of FIG. 1 to a mating piece.

FIG. 6 illustrates attachment of the fiber optic collimator body 12 to a mating piece 84 using the raised pads 80. The collimator body 12 includes a pressed pin 86, an attachment screw 88, and a washer 89 associated with two of the raised pads 80. The attachment screw 88 is disposed through an oversized screw aperture 90 in the body 12. The mating piece 84 includes an oversized pin hole 92 for receiving an end portion of the pin 86, and a threaded aperture 94 for receiving the attachment screw 88. After inserting the end portion of the pin 86 into the pin hole 92 and aligning the collimator 10 to the mating piece 84, an epoxy or the like is back-filled to wet-pin the pin 86 to form a stable interface between the collimator body 12 and the mating piece 84 with no match drilling or adjustment mechanism to change over time. The attachment screw 88 is then tightened to further secure the connection between the two members.

All non-optical (optomechanical) components may be manufactured out of either a metal or a glass depending on the required thermal stability. For most applications, Invar 36 (a low thermal expansion alloy) is adequate for the collimator body 12 and shuttle plug 20 while a close matching metal is desirable for the lens 16, Stainless steel, such as 41.6, are a close match to BK7 and other common glass materials. Ultra low expansion (ULE) glass and Zero-dur typically would only be considered for the optomechanical components in cases where thermal stability is extremely tight (in the nanometer range for milli-Kelvin changes). The collimator is designed to achieve an athermal structure as much as possible by selecting materials with the desired thermal properties and selecting the proper locations of attachment and coupling. For example, the piano interface of the lens cell with the collimator body is nearly in-plane or coplanar with the rear edge of the optic (i.e., the lens) within the lens cell. This allows the lens and the lens cell material to expand/contract axially due to thermal effects without affecting the alignment greatly, even though there is a mismatch in thermal properties between the collimator which is typically Invar and the lens cell which can be stainless steel. Thus, the selection of the interface location allows for a desirable athermalized effect. Another example is the use of two axial locations (30, 32) for attaching the fiber optic ferrule to the shuttle plug, and the use of two axial locations (46, 48) for attaching the shuttle plug to the collimator body. One of the axial locations (32) for attaching the fiber optic ferrule is approximately coplanar with one of the axial locations (46) for attaching the shuttle plug (see FIG. 1).

The length to diameter ratio of the glue holes or tack holes is typically equal to or greater than about 2. The glue holes or tack holes each typically include a countersunk to facilitate introduction of adhesives from different angles.

The collimator is stable over a specific soak temperature range and maintains alignment through adverse vibration. The collimator is configured for easy assembly and for simple and precise adjustment. The collimator may accommodate a single beam or multiple beams (e.g., two beams in the embodiment shown in FIGS. 1–5). For multiple beams, a plurality of optical fibers are connected to a single collimator body having precise collimator bores for receiving and aligning the shuttle plugs containing the optical fibers relative to the respective collimating lenses. After a first set of optical fiber and collimating lens are aligned, the other sets of optical fiber and collimating lens may be aligned with respect to the first set. This simplifies the alignment procedure and increases accuracy.

The above-described arrangements of apparatus and methods are merely illustrative of applications of the principles of this invention and many other embodiments and modifications may be made without departing from the spirit and scope of the invention as defined in the claims. The scope of the invention should, therefore, be determined not with reference to the above description, but instead should be determined with reference to the appended claims along with their full scope of equivalents.

What is claimed is:

1. A fiber optic collimator comprising:
   a shuttle plug including a cavity for receiving an optical fiber having an optical fiber tip to emit a light through the shuttle plug;
   a collimator body having a collimator bore to receive the shuttle plug and constrain the shuttle plug in the collimator bore to be movable in an axial direction along an axis of the collimator bore; and
   a collimating lens mounted to the collimator body and disposed generally opposite from the optical fiber tip to receive a light beam from the optical fiber tip expanding in size toward the collimating lens, the collimating lens being constrained to be movable in a transverse plane normal to the axial direction,
   wherein the shuttle plug is configured to be movable in the axial direction to adjust a position of the optical fiber tip with respect to the collimating lens and wherein the collimating lens is configured to be movable in the transverse plane to align the collimating lens with respect to the optical fiber tip.

2. The fiber optic collimator of claim 1 wherein the shuttle plug includes a fiber optic ferrule to attach the optical fiber and position the optical fiber tip within the shuttle plug.

3. The fiber optic collimator of claim 2 wherein the shuttle plug includes a pin keyway and the collimator body includes a rotation alignment pin configured to engage the pin keyway to prevent rotation of the shuttle plug with respect to the collimator body, and wherein the fiber optic ferrule is rotationally aligned respect to the pin keyway for desired polarization of the light beam from the optical fiber.

4. The fiber optic collimator of claim 2 wherein the fiber optic ferrule is connected to the shuttle plug by an adhesive introduced into adhesive tack bond holes in the shuttle plug at two axial locations along the fiber optic ferrule.

5. The fiber optic collimator of claim 1 wherein the shuttle plug includes an undercut diameter intermediate region between two end regions, and wherein the two end regions each include machined flats to reduce surface contact with the bore of the collimator body.

6. The fiber optic collimator of claim 1 wherein the shuttle plug is connected to the collimator body by an adhesive introduced into adhesive tack bond holes in the collimator body at two axial locations along the shuttle plug.

7. The fiber optic collimator of claim 1 further comprising a lens cell having a seat to receive the collimating lens, the lens cell being configured to mount the collimating lens to the collimator body to permit adjustment in the transverse plane normal to the axial direction to align the collimating lens with respect to the optical fiber tip.

8. The fiber optic collimator of claim 7 wherein the lens cell is connected to the collimator body by an adhesive introduced into adhesive tack bond holes in the collimator body distributed around the lens cell, and wherein the lens cell is attached to the collimator body by a plurality of cell clamps.

9. The fiber optic collimator of claim 1 wherein the collimator body includes a plurality of raised pads which are coplanar and parallel to the axis of the collimator bore, the raised pads being configured to interface with a mating piece to which the collimator body is to be connected.

10. The fiber optic collimator of claim 1 wherein the collimator body includes a plurality of collimator bores to receive a plurality of shuttle plugs, and the collimator body is configured to mount a plurality of collimating lenses each for alignment and focus with respect to a corresponding one of the plurality of shuttle plugs.

11. A fiber optic collimator comprising:
    a shuttle plug including a cavity for receiving an optical fiber having an optical fiber tip to emit a light through the shuttle plug;
    a collimator body having a collimator bore to receive the shuttle plug and constrain the shuttle plug in the collimator bore to be movable in an axial direction along an axis of the collimator bore;
    a collimating lens; and
    a lens cell having a seat to receive the collimating lens, the lens cell being configured to mount the collimating lens to the collimator body generally opposite from the optical fiber tip to receive a light beam from the optical fiber tip expanding in size toward the collimating lens and to permit adjustment of the collimating lens in a transverse plane normal to the axial direction to align the collimating lens with respect to the optical fiber tip.

12. The fiber optic collimator of claim 11 wherein the lens cell is connected to the collimator body by an adhesive introduced into adhesive tack bond holes in the collimator body distributed around the lens cell.

13. The fiber optic collimator of claim 11 wherein the lens cell is attached to the collimator body by a plurality of cell clamps.

14. The fiber optic collimator of claim 11 wherein the collimator body includes a plurality of collimator bores to receive a plurality of shuttle plugs, and the collimator body is configured to mount a plurality of collimating lenses each for alignment and focus with respect to a corresponding one of the plurality of shuttle plugs.

15. A method of mounting an optical fiber and a collimating lens to a collimator body, the method comprising:

mounting an optical fiber to a shuttle plug, the optical fiber having an optical fiber tip to emit a light through the shuttle plug;

sliding the shuttle plug into a collimator bore of the collimator body configured to receive the shuttle plug and constrain the shuttle plug in the collimator bore to be movable in an axial direction along an axis of the collimator bore;

mounting a collimating lens to the collimator body to be disposed generally opposite from the optical fiber tip to receive a light beam from the optical fiber tip expanding in size toward the collimating lens; and moving the shuttle plug in the axial direction to adjust a position of the optical fiber tip with respect to the collimating lens.

16. The method of claim 15 wherein mounting the collimating lens comprises placing the collimating lens in a seat of a lens cell; coupling the lens cell to the collimator body to permit adjustment in a transverse plane normal to the axial direction; moving the lens cell with respect to the collimator body in the transverse plane to align the collimating lens with respect to the optical fiber tip; and attaching the lens cell to the collimator body after the collimating lens is aligned with respect to the optical fiber tip.

17. The method of claim 16 wherein moving the lens cell comprises connecting the lens cell to two linear stages configured to move the lens cell in two orthogonal directions along the transverse plane.

18. The method of claim 15 wherein moving the shuttle plug comprise coupling a focus tooling member with the shuttle plug by supporting a focus tooling rod using a focus tooling clamp temporarily coupled to the collimator body, and wherein the focus tooling member is connected to a linear stage configured to move the shuttle plug in the axial direction to focus the optical fiber tip with respect to the collimating lens.

19. The method of claim 18 wherein further comprising attaching the shuttle plug to the collimator body and removing the focus tooling rod and the focus tooling clamp after focusing the optical fiber tip with respect to the collimating lens.

20. The method of claim 15 wherein mounting the optical fiber comprises coupling the optical fiber to a fiber optic ferrule and attaching the fiber optic ferrule to the shuttle plug to position the optical fiber tip within the shuttle plug.

21. The method of claim 20 wherein the shuttle plug includes a pin keyway, wherein the fiber optic ferrule is rotationally aligned respect to the pin keyway for desired polarization of the light beam from the optical fiber, and further comprising inserting a rotation alignment pin through a portion of the collimator body to engage the pin keyway to prevent rotation of the shuttle plug with respect to the collimator body.

22. The method of claim 15 wherein the collimator body includes a plurality of raised pads which are coplanar and parallel to the axis of the collimator bore, and further comprising interfacing the raised pads with a mating piece to which the collimator body is to be aligned and connected.

23. The method of claim 22 further comprising providing a pin extending from each of two raised pads of the collimator body to an oversized pin hole in the mating piece; wet-pinning the pin to the mating piece by introducing an adhesive into the pin hole; and attaching the collimator body to the mating piece by a plurality of screws.

24. The method of claim 15 wherein the collimator body includes a plurality of collimator bores to receive a plurality of shuttle plugs, and wherein the method comprises sliding a plurality of shuttle plugs into the collimator bores; mounting a plurality of collimating lenses to the collimator body corresponding to the plurality of shuttle plugs; and moving the shuttle plugs in the axial direction to adjust the positions of the optical fiber tips with respect to the corresponding collimating lenses.

* * * * *